US008640605B2

(12) United States Patent
Hart

(10) Patent No.: US 8,640,605 B2
(45) Date of Patent: Feb. 4, 2014

(54) GAS VENTING SYSTEM

(75) Inventor: Burton L. Hart, Auburn, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 1148 days.

(21) Appl. No.: 12/122,920

(22) Filed: May 19, 2008

(65) Prior Publication Data

US 2008/0282895 A1    Nov. 20, 2008

Related U.S. Application Data

(60) Provisional application No. 60/938,953, filed on May 18, 2007, provisional application No. 60/956,246, filed on Aug. 16, 2007.

(51) Int. Cl.
*A47J 31/00* (2006.01)

(52) U.S. Cl.
USPC ..................................... 99/306; 99/293; 222/1

(58) Field of Classification Search
USPC ...................... 99/307, 306, 293, 302 R; 222/1
See application file for complete search history.

(56) References Cited

U.S. PATENT DOCUMENTS

| | | | |
|---|---|---|---|
| 3,261,279 A * | 7/1966 | Kaplan et al. | 99/282 |
| 3,593,650 A * | 7/1971 | Martin et al. | 99/291 |
| 3,740,231 A * | 6/1973 | Drwal et al. | 426/433 |
| 3,793,934 A * | 2/1974 | Martin | 99/282 |
| 4,046,351 A | 9/1977 | Lang | |
| 4,262,877 A | 4/1981 | Lang | |
| 4,286,767 A | 9/1981 | Hashimoto | |
| 4,295,631 A | 10/1981 | Allen | |
| 4,653,390 A * | 3/1987 | Hayes | 99/281 |
| 4,732,362 A | 3/1988 | Moroika et al. | |
| 4,832,313 A | 5/1989 | Hashimoto et al. | |
| 4,930,747 A | 6/1990 | Nakamura | |
| 4,966,070 A * | 10/1990 | Frisch | 99/302 R |
| 5,118,072 A | 6/1992 | Sakamoto et al. | |
| 5,213,303 A | 5/1993 | Walker | |
| 5,245,914 A * | 9/1993 | Vitous | 99/280 |
| 5,267,506 A * | 12/1993 | Cai | 99/280 |
| 5,333,643 A | 8/1994 | Gilchrist et al. | |
| 5,386,849 A | 2/1995 | Gilchrist et al. | |
| 6,505,812 B1 | 1/2003 | Anastas | |
| 6,688,577 B2 | 2/2004 | Abbott | |

* cited by examiner

*Primary Examiner* — Reginald L Alexander
(74) *Attorney, Agent, or Firm* — Barnes & Thornburg LLP

(57) ABSTRACT

Beverage making equipment, water heating equipment, and methods for using such equipment which use heated water and dispenses heated water from a heated water reservoir. The apparatus includes a water line extending from the heated water reservoir to a dispensing point, the line having a positive slope between the reservoir and dispensing point. A vent tube may also be used communicating with and coupled to the line with a return passage communicating with the vent and reservoir. The method of dispensing water from a heated water reservoir involves dispensing water from the reservoir at one level and delivering water to a dispensing point at a second level positioned at a positive dimension above the dispensing port of the heated water reservoir. the method may also include providing a vent tube coupled to and communicating with the line for removing gas which evolves from water passing through the line and returning the gas to the reservoir.

8 Claims, 3 Drawing Sheets

GAS VENTING SYSTEM

RELATED APPLICATION

This application claims the priority of U.S. Provisional Patent Application Nos. 60/938,953, filed May 18, 2007, and 60/956,246, filed Aug. 16, 2007, the complete disclosures of which are both hereby expressly incorporated by reference.

BACKGROUND

The present disclosure relates to beverage making equipment, namely, beverage making equipment which utilizes heated water and dispenses heated water from a heated water reservoir to a beverage making substance.

A variety of beverage making devices utilize a heated water reservoir to retain a volume of water in a heated condition for use in making beverages. Water can be controllably dispensed from the reservoir to a holder or container which contains a quantity of beverage making substance. The heated water is combined with the beverage making substance to produce a beverage. In such a beverage making machine, the reservoir can operate in a gravity feed mode of operation or a pressurized mode of operation. Also, one of the conditions associated with the heating of water is the evolution or out-gassing of gas which might be retained in the water. For example, at lower temperatures the water may have some portion of gas dissolved into the water. Heating may release the gas or otherwise evolve the gas through chemical processes. One of the problems with the gas which is created during the heating of the water is that it can be introduced into the beverage making process. Introduction of gas to the beverage making process has little or no currently known direct effect on the beverage making substance or the beverage produced thereby. The gas, however, can have an effect on the beverage making process.

Gas which evolves or otherwise comes out of the water in the reservoir may be vented through a venting device on the reservoir. If the reservoir does not include a venting device or if the gas evolves in other components of the reservoir and beverage making apparatus the gas may accumulate and interfere with the dispensing of heated water from the reservoir. In this regard, a line or tube is connected to the reservoir and extends from the reservoir to a spray head which dispenses the heated water over the beverage making substance in the holder. Gas may evolve in the line or may be introduced into the line and if retained in the line in sufficient quantity may introduce a variable which could have a negative effect on the brewing process.

Gas introduced into the line and retained in the line may be inconsistent, may break up or pass through the line and reform, or other undesirable conditions. Regardless, the presence of gas in the line can be problem because it reduces the flow volume through the line. The reduction in flow volume through the line is detrimental to the brewing process since the machine may be configured to dispense a volume of water based on the time a valve associated with the dispensing process is opened. In other words, at least one valve is provided in the process for control of water through the heated water reservoir. In this regard, if the time of the valve opening is held generally consistent the expectation would be that a generally consistent volume of water would be dispensed. However, if a portion of the dispense line is blocked, obstructed or otherwise occupied by gas, the volume dispensed will be inconsistent with the expected volume dispensed. Further, the volume dispensed will be inaccurate or may be in accurate as a result of the bubble forming, passing through, reforming and presenting indifferent gas volumes during different brew cycles. The existence of gas in the line introduces a variable which is not controllable. The variable can introduce inconsistencies in the beverage brewed since the characteristics of the brewed beverage are directly related to the volume of water used in the brewing process.

Further, inaccurate dispensing of water may introduce cost inefficiencies. While the cost and efficiency per cycle may be somewhat nominal, cumulatively the cost and efficiencies can be somewhat significant. In this regard, shorting a brewing cycle of the amount of water will reduce the number of cups produced. Reducing the number of cups produced per charge of beverage making substance, will reduce the profit produced. Again, while this may not seem significant on a per cycle basis, cumulatively, for exampled over numerous franchise operations, this could be a significant number. The reduction and the inconsistencies in the water flowing through the line can be reduced by eliminating the gas accumulation in the line.

BRIEF DESCRIPTION OF THE DRAWINGS

The organization and manner of the structure and function of the disclosure, together with the further objects and advantages thereof, may be understood by reference to the following description taken in connection with the accompanying drawings, and in which.

DETAILED DESCRIPTION

Figure 1:
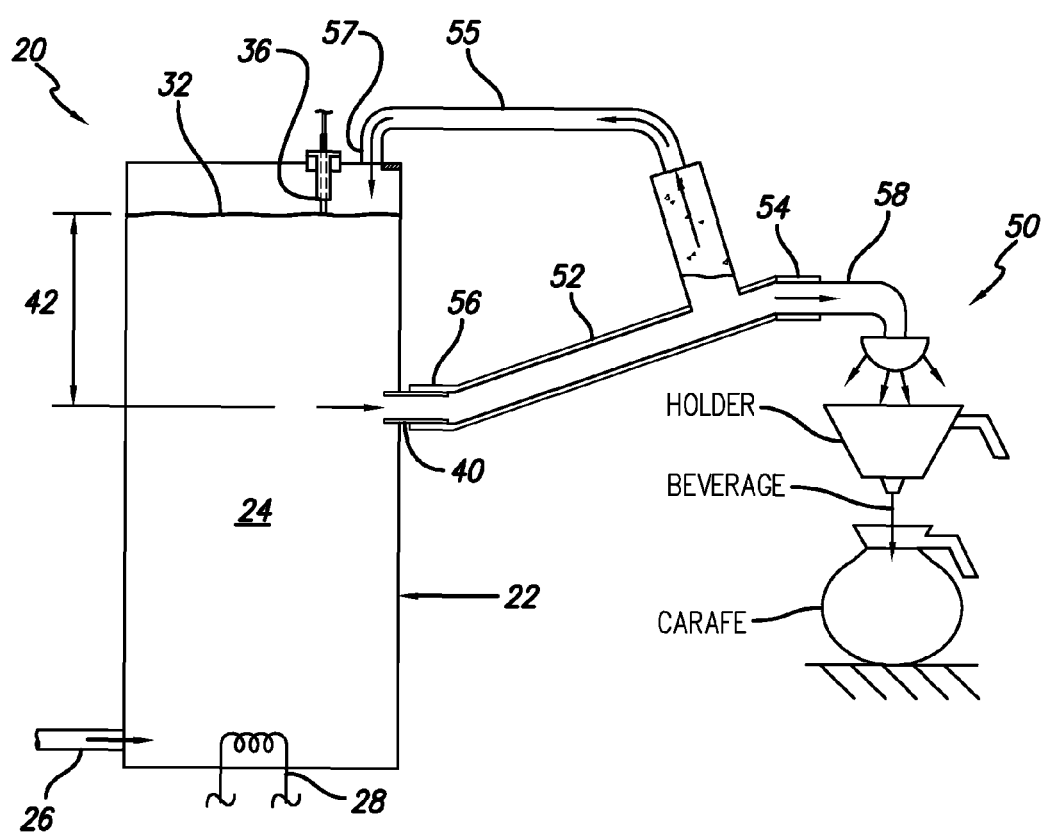
FIG. 1 is a simplified generally diagrammatic illustration of a heated water reservoir showing a line connected to the heated water reservoir and a corresponding spray head to show a relationship between the reservoir, spray head and line, a vent tube coupled to the spray head line and connected to the heated water reservoir, the illustration being significantly simplified in the interest of illustrating the general principals of the present disclosure.

While the present disclosure may be susceptible to embodiment in different forms, there is shown in the drawings, and will be described herein in detail, one or more embodiments with the understanding that the present description is to be considered an exemplification of the principles of the disclosure and is not intended to be exhaustive or to limit the disclosure to the details of construction and the arrangements of components set forth in the following description or illustrated in the drawings.

With reference to FIG. 1, a beverage making apparatus 20 is shown. The apparatus includes a heated water reservoir 22 containing a volume of water 24. Water is introduced through a fill line 26 to a lower portion of the reservoir 22. A heating device 28 introduces heat energy to the water thereby heating for use during beverage making cycles. A water level 32 is established in the reservoir 22 by a level sensor 36. The level sensor detects the level of water in the reservoir and caused water to be added when the water level drops. A variety of level sensing devices may be provided in the form of conductivity detecting, acoustic, optical, or any other device or system for sensing a level of water in a reservoir. It is envisioned that the reference to the water level sensor is to be broadly interpreted.

The reservoir has an outlet port 40 through which heated water is dispense. A volume of water above the outlet port 42 defines the head for pressurizing the volume of water. The head pushes water out of the outlet port 40 under force of gravity. It should be noted that other forms of heated water dispensing devices may be provided that may not use a head 42 to drive water from the system. In this regard, the system could be driven by pressure of water introduced through the inlet line 26 or a combination of head and inlet line control. There is also envisioned that the reservoir may be pressurized such that a volume of air may be introduced into the reservoir to drive water from the reservoir in a controlled manner. With the foregoing in mind, it is envisioned that all forms of apparatus and processes for dispensing a volume of heated water from a heated water reservoir 22 should be considered and incorporated in this disclosure.

In the illustration of FIG. 1, a spray head 50 or dispensing point is provided. The spray head is connected to the heated water reservoir by a line 52 extending there between.

The spray head and reservoir may be connected in a male-female coupling configuration.

Figure 2:
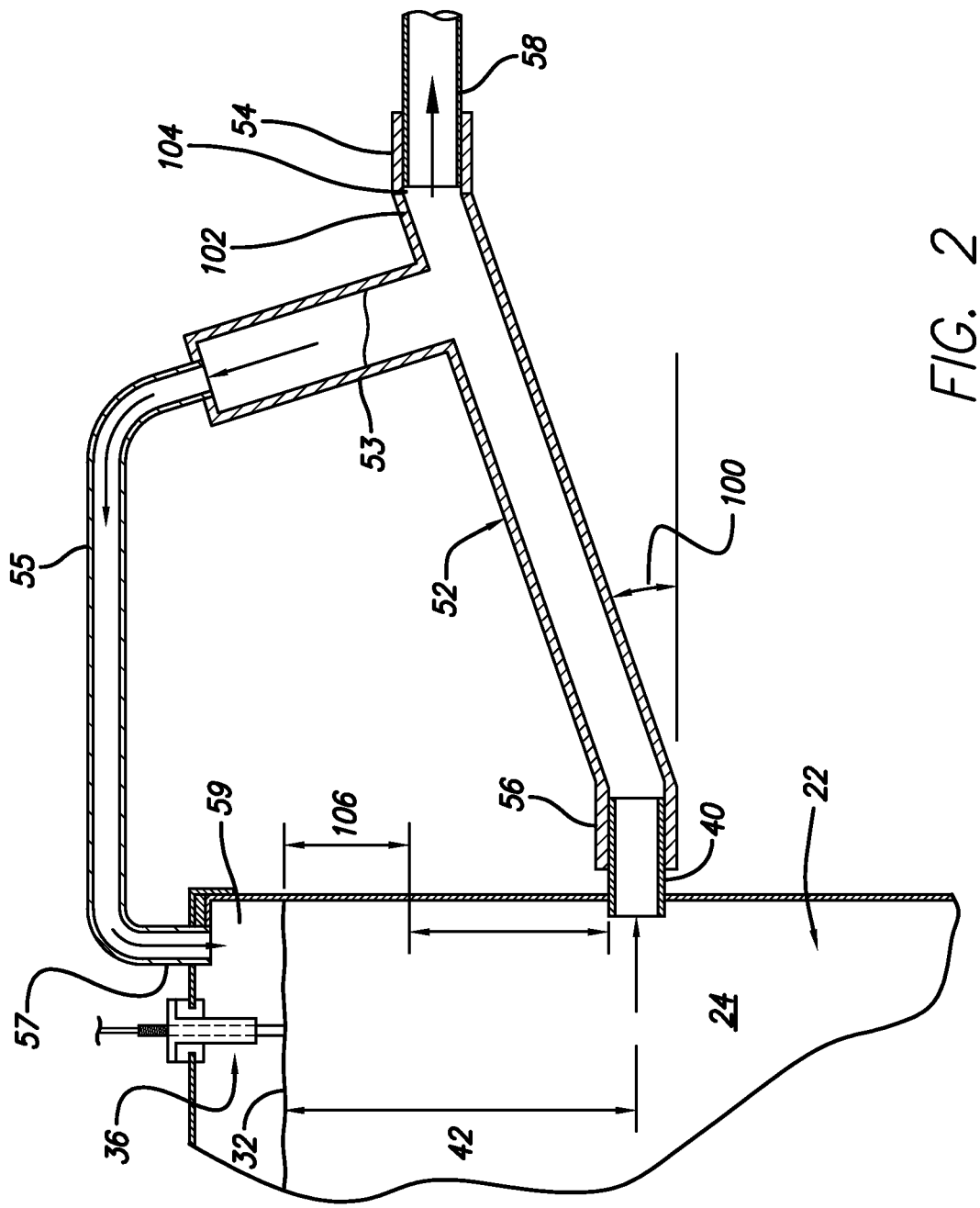
FIG. 2 is an enlarged, partial fragmentary, cross-sectional view of the simplified diagrammatic illustration in FIG. 1 showing the relationship of the line, connection to an outlet of the reservoir, and connection to a feed line associated with a corresponding spray head, and the vent tube coupled to the line the relationships also showing a path for the passage of an accumulation of gas in the line.
Figure 3:
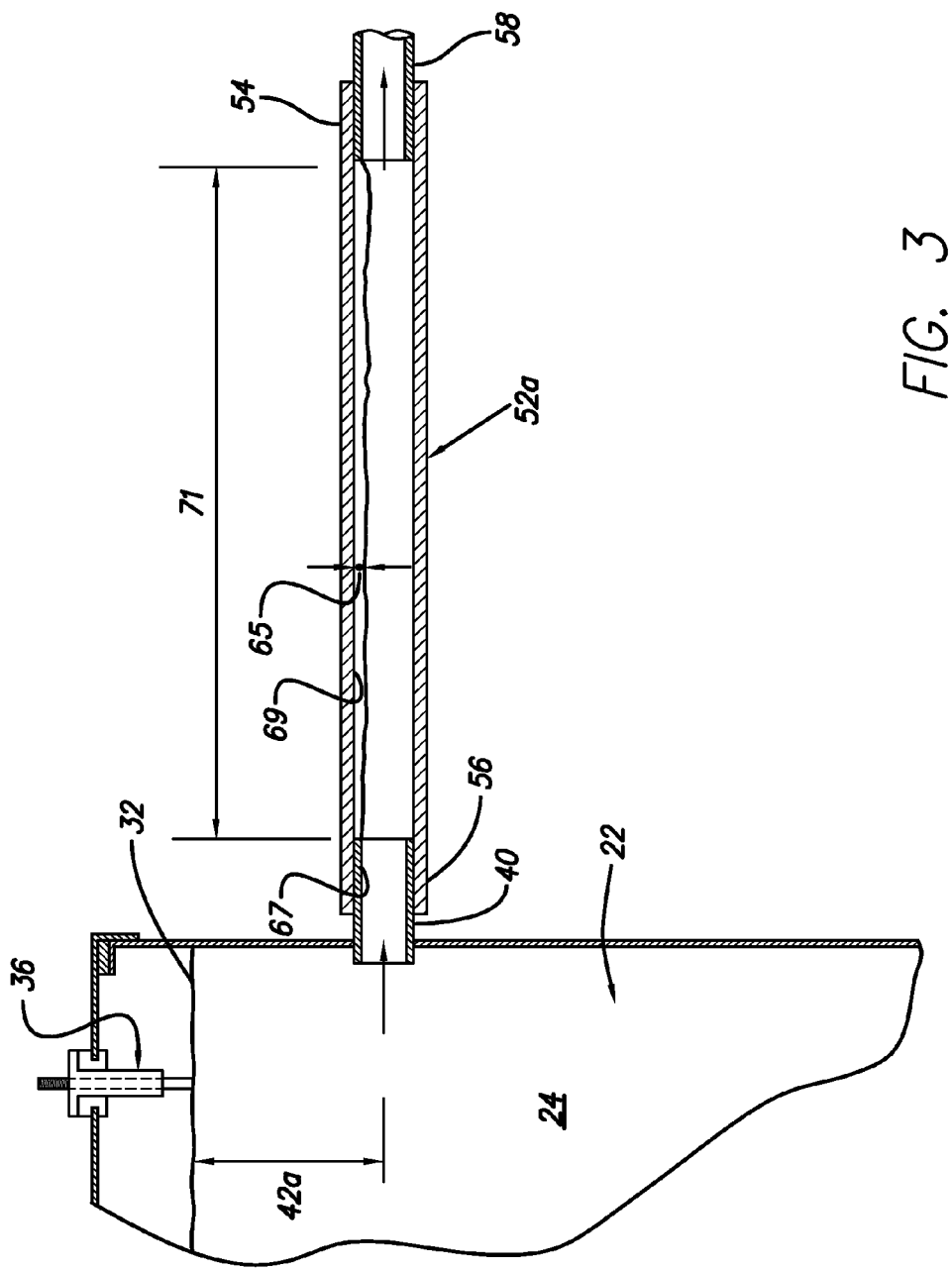
FIG. 3 is a view similar to that as shown in FIG. 2 illustrating some of the characteristics, conditions and relationships associated with a prior art line connecting a heated water reservoir to an associated spray head.

In this regard, the line 52 may have ends 54, 56 which extend over the corresponding spray head port 58 and outlet port 40. While the coupling configuration may be reversed such that the ends of the line 54, 56 may insert into the corresponding ports 58, 40, one configuration is shown in FIG. 1. Additionally, the configuration with the line over the ports is shown in FIGS. 2 and 3. One reason for this configuration is that this allows the ports 58, 40 to be of rigid construction with the line 52 being of a flexible construction. In this regard, the ends 54, 56 may be de-formably attached over the port 58, 40. The ends may be retained over the ports as a function of the flexibility of the line 52 material which may also include a clamp or other retaining device extending over the corresponding outside surface of the ends 54, 56 to provide additional clamping force on the corresponding portions of the ports 58, 40.

Terms including beverage, beverage making, brewed, brewing, brewing substance, brewed liquid, and brewed beverage as may be used herein are intended to be broadly defined as including, but not limited to, the brewing or making of coffee, tea, herbs, other substances and any other form of beverages or food substances. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified, and will benefit from or find application for the present disclosure. This broad interpretation is also intended to include, but is not limited to beverage substances such as ground coffee, tea, herbs, botonicals, liquid beverage concentrate, powdered beverage concentrate, flaked, granular, freeze dried or other forms of materials including liquid, gel, crystal or other forms of beverage or food materials to obtain a desired beverage or other food product.

With reference to FIG. 3, prior art dispensing lines 52a extend from a corresponding outlet port 40 and connect to a corresponding port 58 on the spray head. In the prior art, the orientation of the line 52a is generally horizontal as having a slope of approximately zero (0). As a result of this orientation, and of the coupling of the line 52a to the ports 40, 58 a gap 65 is defined between the dimensional difference of the inside surface 67 of the port 40 and the inside surface 69 of the line 52. The dimensional difference or gap 65 extending between the ports 40, 58 define an area 71 in which gas may accumulate. The length of the line 52 combined with the horizontal orientation and the gap 65 result in an area which a significant volume may be occupied by gas. Some estimates suggest 30%-50% of the passage volume can be displaced by the gas, air bubbles. This equated to a significant reduction in the volume of water that can flow through the line 52a. As a result, the volume of water flowing through the line might be significantly reduced. The volume might be significantly reduced because during some brewing cycles the bubble may be swept away, other cycles the bubble may be at its maximum, and further still other cycles' bubbles may be irregular with pockets of gas retained in the gap at different portions of the length of line 52a. This unpredictability and inconsistency in the bubble volume creates significant variability in volume of water flowing through the line 52a. This problem may be exacerbated in large volume brewers which use larger volumes of water to produce larger volumes of beverage.

Attempts to adjust for this variability have been somewhat unsuccessful. The attempts to adjust for the variability include calibrating the brewer or beverage maker so as to compensate for a maximum volume of gas which may occupy the gap 65. However, the volume of gas is unpredictable and calibrating for a maximum volume may result in too much water flowing through when the bubble is absent or when different volumes of gas are retained in the line 52a.

The variability arises depending on the flow rate, the surface tension of the water, the surface texture or characteristics of the line and corresponding line 52a and corresponding ports 40, 58, the temperature, the mineral content of the water as well and any number of other factors. As a result of these numerous and somewhat unpredictable variables, it would be desirable to produce a beverage making device in which there might be additional consistency in the flow of water from the reservoir to the spray head. This interest is relevant in light of not only the variability of the size and volume of the gas bubble formed in the line 52a, but also the variability of the water which might flow through such a process depending the geographic location, pressure, dissolved gases, as well as other characteristics of the water and setting in which the beverage maker is used.

With reference to FIG. 2, a line 52 is disclosed which is attached to the ports 40, 58 at ends 56, 54, respectively. The line 52 and associated reservoir 22 and spray head 50 have all the characteristics, functions and features as disclosed hereinabove. As can be seen in the enlarged view of FIG. 2, the line 52 extends from the outlet port 40 of the reservoir 22 at an angle or slope 100 and connects to the port 58 at end 54. The resulting slope allows evolved gas to flow with the water flow upwardly as gas is buoyant. As it travels from the outlet port 40 towards spray head port 58 the only dimensional mismatch involved the connection of the end 54 to the port 58.

A vent tube 53 is coupled to the line 52. The vent tube may have the same, smaller or greater diameter than the line 52. As shown in FIGS. 1 and 2, the vent tube 53 has an equal or slightly greater diameter while cross sectional area than the line 52. This allows a volume of gas to evolve from the line 52. A return line 55 couples to the vent tube 53 at one end and to the reservoir 22 at the other end. An outlet 57 of the passage 55 communicates with an upper portion 59 of the reservoir 22. As such, the vent tube 53, return line 55 and outlet 57 provide a path through which gas which evolves from the water flowing through the line 52 can return to the upper portion 59 of the reservoir. The gas or air bubbles carried in the water flowing through the line travel out of the fluid at the vent tube 53 and exit up and out through the return line 55 back to the upper portion or air gap 59 of the reservoir 22.

Providing a greater path and opportunity for air to vent through and be returned to the system dramatically increases the consistency of flow through the line 52.

Consistency of the volume of water delivered through the line 52 is important to providing consistent beverage flavor as well as brewed beverage volumes. As noted above, prior art systems may result in dramatic variability. By significantly reducing or eliminating variability in the water flow volume, beverage consistently can be greatly increased.

Positioning of the vent tube 53 may prove to be desirable along the upper portion of the sloped tube 52. The gas flowing through the tube will tend to climb as it follows the uphill pass. The gas may evolve from the water flowing through the line 52 as a result of some what reduced pressure as it climbs the uphill slope. At the point where the tube transitions to the spray head gas can be removed. Alternatively, the vent tube 53 could be positioned any where along the line between the outlet of the reservoir up to the spray head. Positioning of the vent tube 53 closer to the spray head may provide benefits such that the head developed between the water level 32 and outlet tube 40 may have less of an effect on the vent tube 53 positioned away from and upwardly along the tube 52. As an additional benefit, any steam or other condensation can be returned through the return line 55. This configuration provides a closed loop system to maintain moisture, fluid, and air within the system.

Further, the dimensional difference is defined by a relatively small triangular section only at the top of the connection between the line 52 and port 58. The dimensional difference between the potential air bubbles formed in the line 52 at a void 102 is nominal and insignificant compared to the potential bubble size that can be formed in the gap 65 as shown in FIG. 3. In the disclosed line 52 as shown in FIGS. 1 and 2, the gas bubble is generally consistent since gas flowing through the line 52 will replenish the void 102 as it passes through the line towards the spray head. As such the combination of the consistency and the nominal size tend to minimize or effectively remove any negative impact caused by gas in the line 52. The nominal volume of air 104 allows the beverage maker to be calibrated accurately for a flow rate. This is because the variability in the bubble 104 size is so small it has little, if any impact on the flow rate through the line 52.

While specific angular and proportional dimensions are not required, an example is provided by way of illustration and not limitation. It should be noted that the upward slope from the outlet port 40 to the spray head port 58 needs to be sufficiently angled to allow the gas to flow within the line. The angle must be greater than zero. Also, detailed refinement of the minimal angle can be achieved by understanding the effects of the interior surface material of the line 52, and the accumulated mineral deposits which might ordinarily and customarily develop over time in such a line as well as characteristics of the water in which the beverage maker is installed. Once again, the beverage maker can be calibrated in its installed setting thereby accommodating some of these variables. The result will be that the disclosed line 52 disposed at an angle between the ports 40, 58 will eliminate the variability in the water flow through the line.

It should be noted that this also impacts any bypass lines in which water is directed not to the spray head but to a line which introduces water at another portion of the beverage making process. For example, in a beverage brewing system some portion of water may be directed over the beverage making substance while another portion of water is directed to an outside portion of the funnel. As a result the streams are brought together to produce the final brewed beverage. The stream passing to a different portion of the funnel is known as a bypass stream. The teachings as described herein also apply to such a bypass line to help further reduce any inconsistencies in the bypass and increase the consistency of the resulting beverage.

With reference to FIG. 2, the head 42 is shown to be approximately 3-¾ inches. The portion of water 106 above the spray head port 58 is approximately 2-¼ inches. The dimensional difference between the output 40 and the spray head port 58 is approximately 1-½ inches. This 1-½ inch vertical dimension is combined with a horizontal dimension of approximately 5 inches. The resulting positive slope or angle 100 between the port 40, 58 facilitates movement of gas in the line 52 towards the spray head.

The invention claimed is:

1. A beverage making device comprising
a heated water reservoir for retaining a volume of water in a heated condition and a holder for retaining a beverage making substance for infusion with the heated water during a brewing process,
a dispensing line extending from a side of the heated water reservoir to a dispensing point proximate the holder for delivering heated water to the holder for making a beverage during the brewing process,
a vent tube having a first end communicating with and coupled to the dispense line at a position spaced from the reservoir,
a return passage communicating with a second end of the vent tube and the reservoir at a location on the reservoir spaced apart from the dispensing line for collecting gas from the dispensing line and returning it to the reservoir.

2. The beverage making device of claim 1, further comprising the dispensing line having a positive slope between the reservoir and dispensing point.

3. The beverage making device of claim 1, further comprising the vent tube having a cross sectional area which is greater than the cross sectional area of at least a portion of the dispensing line to facilitate out gassing and return of gas to the reservoir.

4. The beverage making device of claim 3, further comprising a portion of the vent tube extending above the corresponding water level of the water in the reservoir.

5. The beverage making device of claim 1, further comprising the return line extending from dispensing line and communicating with a top portion of the reservoir for coupling to the reservoir at a location above the water level of the reservoir.

6. A beverage making device comprising
a heated water reservoir for retaining a volume of water in a heated condition and a holder for retaining a beverage making substance for infusion with the heated water during a brewing process,
a dispensing line extending from a side of the heated water reservoir to a dispensing position proximate the holder for delivering heated water to the holder for making a beverage during the brewing process,
the dispensing line having a positive slope defined between the reservoir and the dispensing position,
a return line coupled to the dispensing line at one end spaced from the reservoir, and a second end of the return line coupled to the reservoir at a location on the reservoir spaced apart from the dispensing line for collecting gas from the dispensing line and returning it to the reservoir.

7. A method of dispensing water from a heated water reservoir of a beverage maker for use in making beverages, the method comprising the steps of:
- providing a holder for retaining a beverage making substance;
- providing a dispensing line communicating with the reservoir at a dispensing port and extending from the reservoir to a dispensing position proximate the holder for delivering heated water to the holder for making a beverage;
- dispensing water from the reservoir at one level;
- delivering water to a dispensing position at a second level positioned at a positive dimension above the dispensing port of the heated water reservoir;
- providing a return line coupled to the dispensing line at one end and to the reservoir at a spaced apart end;
- collecting gas from the dispensing line in the return line; and
- returning the collected gas to the reservoir.

8. A method of dispensing water from a heated water reservoir of a beverage maker for use in making beverages, the method comprising the steps of:
- providing a holder for retaining a beverage making substance;
- providing a dispensing line communicating with the reservoir at a dispensing port and extending from the reservoir to a dispensing position proximate the holder for delivering heated water to the holder for making a beverage;
- dispensing water from the reservoir at one level through the dispensing line;
- delivering water to a dispensing position proximate the holder and at a second level positioned at a positive dimension above the dispensing port of the heated water reservoir;
- providing a vent tube coupled to and communicating with the dispensing line;
- removing gas which evolves from water passing through the dispensing line; and
- returning the gas to the reservoir through the return line.

* * * * *

UNITED STATES PATENT AND TRADEMARK OFFICE
CERTIFICATE OF CORRECTION

PATENT NO. : 8,640,605 B2
APPLICATION NO. : 12/122920
DATED : February 4, 2014
INVENTOR(S) : Burton L. Hart Page 1 of 1

It is certified that error appears in the above-identified patent and that said Letters Patent is hereby corrected as shown below:

In the Claims

Please amend claim 5 as follows:

claim 5, at column 6, line 48, delete the words "return line" and add in its place the words --return passage--

Please amend claim 8 as follows:

claim 8, at column 8, line 20, delete the words "the return line" and add in its place the words --a return line--

Signed and Sealed this
Twenty-seventh Day of May, 2014

Michelle K. Lee
*Deputy Director of the United States Patent and Trademark Office*